US007319765B2

(12) United States Patent
Suyama et al.

(10) Patent No.: US 7,319,765 B2
(45) Date of Patent: Jan. 15, 2008

(54) PARAMETER SETTING DEVICE

(75) Inventors: Akio Suyama, Hamamatsu (JP); Kenji Ikeya, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 707 days.

(21) Appl. No.: 10/655,202

(22) Filed: Sep. 4, 2003

(65) Prior Publication Data

US 2004/0172144 A1 Sep. 2, 2004

(30) Foreign Application Priority Data

Sep. 6, 2002 (JP) ............................ 2002-260986
Sep. 6, 2002 (JP) ............................ 2002-260987

(51) Int. Cl.
*H04B 1/00* (2006.01)

(52) U.S. Cl. ........................................ 381/119; 700/94

(58) Field of Classification Search ................ 381/119; 700/94

See application file for complete search history.

(56) References Cited

U.S. PATENT DOCUMENTS

| | | | | | |
|---|---|---|---|---|---|
| 5,054,077 | A * | 10/1991 | Suzuki | ........................ | 381/109 |
| 5,239,458 | A * | 8/1993 | Suzuki | ........................ | 700/83 |
| 5,623,551 | A * | 4/1997 | East et al. | .................. | 381/119 |
| 6,153,994 | A | 11/2000 | Royer et al. | | |
| 6,795,560 | B2 * | 9/2004 | Hamamatsu | ................ | 381/119 |
| 6,967,452 | B2 * | 11/2005 | Aiso et al. | .................. | 318/466 |
| 6,985,595 | B2 * | 1/2006 | Kohyama et al. | ........... | 381/119 |
| 7,092,540 | B2 * | 8/2006 | Eastty et al. | ................ | 381/119 |

OTHER PUBLICATIONS

Digital Production Console DM 2000 Owner's Manual, Yamaha Corporation, Jun. 2002, pp. 157-163.

Digidesign ProControl User's Guide, Digidesign Inc., a Division of Avid, pp. 167-177.

Panasonic Audio Mixer WR-DA7 Operation Manual, Matsushita Communication Industrial Co., Ltd., Japan, 1998, pp. 183-187.

H. Miyahara, "Digital Console For Professional use Proud of its Excellent Basic Performance", Sound & Recording Magazine, Japan, Ritto Music Co., Ltd., Jan. 1, 2001, vol. 20, No. 1, Sequential vol. No. 237, pp. 246-249.

* cited by examiner

*Primary Examiner*—Vivian Chin
*Assistant Examiner*—Lun-See Lao
(74) *Attorney, Agent, or Firm*—Morrison & Foerster LLP

(57) ABSTRACT

A parameter setting device includes faders 15*a* to 15*c* to which a plurality of parameters are respectively allotted. The plural parameter values are respectively set in accordance with the operation positions of faders 15*a* to 15*c*. When scene selection switches 24 to 26 are operated, the plural parameter values are gradually changed in accordance with the lapse of time towards the final values represented by scene data. During this change of the parameter values, faders 15*a* to 15*c* are driven by a motor and move in correspondence with the parameter values. When invalidation switches 12*a* to 12*c*, 21 are operated during this movement of faders 15*a* to 15*c*, the movement of faders 15*a* to 15*c* is controlled to be stopped, and the parameter values are instantaneously changed to the final values according to the scene data. When scene selection switches 24 to 26 are operated after the operation of invalidation switches 12*a* to 12*c*, 21, the movement of faders 15*a* to 15*c* is controlled to be prohibited, and the parameter values are instantaneously changed to the final values according to the scene data. When release switches 13*a* to 13*c*, 22 are operated after these, faders 15*a* to 15*c* move to positions corresponding to the parameter values.

16 Claims, 11 Drawing Sheets

| | |
|---|---|
| ch1 | off |
| ch2 | off |
| ch3 | off |
| ch4 | off |
| ch5 | off |

| | |
|---|---|
| ch1 | on |
| ch2 | on |
| ch3 | on |
| ch4 | off |
| ch5 | off |

| | |
|---|---|
| ch1 | off |
| ch2 | off |
| ch3 | off |
| ch4 | off |
| ch5 | off |

Solid line: Current value of the parameter

Broken line: Operation position of the fader

PARAMETER SETTING DEVICE

BACKGROUND OF THE INVENTION

1. Field of the Invention

The present invention relates to a parameter setting device that realizes collective renewal of the values of parameters allotted to a plurality of mechanical operators, as well as to a computer program applied to the device.

In particular, the present invention relates to a parameter setting device suitable for audio mixers (audio mixing systems) that use the aforementioned collective renewal function (scene function) for mixing the audio signals (voice signals, tone signals, etc.) of a plurality of input channels and for outputting the mixed audio signals to a plurality of output channels, as well as to a computer program applied to the device.

2. Description of the Background Art

In a conventional audio mixing system, in mixing input signals of a plurality of channels in an arbitrary manner and outputting the mixed signals through a plurality of arbitrary channels, values of various parameters (level, effect, etc.) are set by a plurality of operators, such as faders of respective channels, for tone volume balance, tone quality adjustment, and the like (see, for example, "PM1D DIGITAL AUDIO MIXING SYSTEM" (catalog code: QGP111), YAMAHA CORPORATION, November 2001, p. 6).

The set values of such various parameters are stored as one "scene" data, and these can be recalled (read out) for automatic collective renewal of the current values of the respective parameters to the set values (final values). The term "collective renewal" refers to a process of simultaneously changing the plurality of parameters. The renewal time (fade time) through which the parameters are changed to the final values is set, for example, at a value from 0 sec to 60 sec, 0.1 sec by 0.1 sec.

At the time of collective renewal, the operation grips of these faders are automatically driven by an electric motor, and the operation positions thereof are controlled to be moved to positions corresponding to the current values of the parameters allotted to these faders.

However, when the operation grips of the faders of a plurality of channels are simultaneously controlled to be moved in position at the time of collective renewal, there arises a case in which the operation sounds accompanying the position control become mechanical noises of a considerable (non-ignorable) degree.

In addition, when the collective renewal is once started, the process cannot be stopped until the collective renewal process is completed. This raises a problem in that, when one wishes to stop the collective renewal process on the parameters of all the channels or a part of the channels, for example, due to occurrence of a situation different from an expected situation during the collective renewal, one cannot stop the process in the midway.

SUMMARY OF THE INVENTION

The present invention has been made in order to solve the aforementioned problems of the prior art, and an object thereof is to provide a parameter setting device that restrains mechanical noises generated by control of the operation positions at the time of collective renewal of the parameters allotted to mechanical operators such as faders, as well as a computer program applied to the device.

Also, the present invention provides a parameter setting device capable of stopping the collective renewal process during the collective renewal of parameters allotted to a plurality of mechanical operators, such as a plurality of faders provided in input/output channels of an audio mixing system, as well as a computer program applied to the device.

In order to achieve the aforementioned object, the present invention is applied to a parameter setting device having a plurality of mechanical operators to which a plurality of parameters are respectively allotted, said mechanical operators respectively setting values of the parameters in accordance with respective operation positions, a collective renewal data memory that stores collective renewal data for collectively renewing the values of said plurality of parameters, and a collective renewal controlling section for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time.

According to one aspect of the present invention, the parameter setting device further includes an invalidation command issuing section for issuing a command of invalidation of said plurality of mechanical operators, and an invalidation controlling section for setting the values of said plurality of parameters to the values represented by said collective renewal data and for stopping the movement of said plurality of mechanical operators when the command of invalidation of said plurality of mechanical operators is issued by said invalidation command issuing section during the change of the values of the parameters and the movement of the operation positions of the mechanical operators by said collective renewal controlling section.

This allows that, in case the noises accompanying the movement of the plurality of mechanical operators raise a problem as a result of issuance of a command of collective renewal of the plurality of parameters, the movement of the plurality of mechanical operators is stopped, while the plurality of parameters are collectively renewed, by issuance of a command of invalidation of the plurality of mechanical operators by the invalidation command issuing section, whereby the generation of noises can be restrained.

According to another aspect of the present invention, the parameter setting device further includes an invalidation command issuing section for issuing a command of invalidation of said plurality of mechanical operators, an invalidation standby state setting section for setting the plurality of mechanical operators to an invalidation standby state when the command of invalidation of the plurality of mechanical operators is issued by said invalidation command issuing section in a state in which the values of the parameters are not changed and the operation positions of the mechanical operators are not moved by said collective renewal controlling section, and an invalidation controlling section for setting the values of the parameters, which are allotted to said plurality of mechanical operators, to the values represented by said collective renewal data and for prohibiting the movement of said plurality of mechanical operators when said command of collective renewal is issued in a state in which the plurality of mechanical operators are set to the invalidation standby state by said invalidation standby state setting section.

This allows that, in case the noises accompanying the movement of the plurality of mechanical operators may possibly raise a problem, the movement of the plurality of mechanical operators is prohibited, while the plurality of parameters are collectively renewed, by issuance of a command of invalidation of the plurality of mechanical operators by the invalidation command issuing section before issuance of the command of collective renewal of the plurality of parameters, whereby the generation of noises can be restrained.

In these aspects of the present invention, the parameter setting device may be constructed, for example, in such a manner that said invalidation command issuing section is provided commonly for said plurality of mechanical operators and is constructed with one invalidation operator that commonly issues a command of invalidation of said plurality of mechanical operators, and said invalidation controlling section commonly controls setting of the values of said plurality of parameters and stopping of the movement (or prohibition of the movement) of said plurality of mechanical operators in response to operation of said invalidation operator. This allows that the generation of noises accompanying the movement of all the mechanical operators can be eliminated by a simple operation.

Alternatively, the parameter setting device may be constructed in such a manner that said invalidation command issuing section is provided in respective correspondence to said plurality of mechanical operators and is constructed with a plurality of invalidation operators that respectively issue commands of invalidation of said plurality of mechanical operators independently, and said invalidation controlling section controls setting of the values of said plurality of parameters and stopping of the movement (or prohibition of the movement) of said plurality of mechanical operators individually in response to respective operation of said plurality of invalidation operators. This allows that, while one must operate all the invalidation operators corresponding to all the mechanical operators in order to eliminate the generation of noises accompanying the movement of all the mechanical operators, the movement of a part of the mechanical operators may be stopped (or prohibited) to permit the movement of the other operators when one wishes to eliminate the generation of noises accompanying the movement of a part of the mechanical operators. In this case, by permitting the movement of the mechanical operators that are frequently used, the operability of the mechanical operators will be good after collective renewal of the parameters. Furthermore, when mechanical operators whose operation positions require a larger amount of movement are adopted as the mechanical operators whose movement is to be stopped (or prohibited), the noises can be restrained more effectively.

In addition, in the aforesaid aspects of the present invention, the parameter setting device may further include a release command issuing section for issuing a command of release of the invalidation of a part of or all of said plurality of mechanical operators, and a release controlling section for allowing movement of mechanical operators to which the command of release of the invalidation is issued, to operation positions corresponding to the values of the parameters allotted to the mechanical operators in response to the command of release of the invalidation by said release command issuing section. In this case, the aforesaid release command issuing section can be constructed with an exclusive-use operator for issuing a command of release of the invalidation of a part of or all of said plurality of mechanical operators. Also, the aforesaid release command issuing section can be constructed to sense physical contact to said plurality of mechanical operators or displacement of said plurality of mechanical operators, and to issue a command of release of the invalidation of mechanical operators for which the physical contact or displacement has been sensed upon sensing the physical contact or displacement.

This allows that, under a situation in which the noises accompanying the movement of the mechanical operators do not raise a problem, the mechanical operators can be moved to operation positions corresponding to the values of the parameters allotted to the mechanical operators by issuing a command of release of the invalidation of the mechanical operators. As a result of this, the values of the parameters can be observed with eyes by making reference to the operation positions of the mechanical operators.

Also, according to another aspect of the present invention, the parameter setting device further includes a release command issuing section for issuing a command of release of the collective renewal of the values of said plurality of parameters, and a release controlling section for stopping the change of the values of said plurality of parameters and for stopping the movement of said plurality of mechanical operators when the command of release of the collective renewal is issued by said release command issuing section during the change of the values of the parameters and the movement of the operation positions of the mechanical operators by said collective renewal controlling section.

In this case, the aforesaid release command issuing section may be provided commonly for said plurality of parameters and may be constructed, for example, with one release operator that commonly issues a command of release of the collective renewal of the values of said plurality of parameters, and the aforesaid release controlling section may commonly control stopping of the change of the values of said plurality of parameters and stopping of the movement of said plurality of mechanical operators in response to operation of said release operator.

Alternatively, the aforesaid release command issuing section may be provided in respective correspondence to said plurality of parameters and may be constructed with a plurality of release operators that respectively issue commands of release of the collective renewal of the values of said plurality of parameters independently, and the aforesaid release controlling section may control stopping of the change of the values of said plurality of parameters and stopping of the movement of said plurality of mechanical operators individually in response to respective operation of said plurality of release operators.

In this other aspect of the present invention, the change of the values of the parameters can be stopped and the movement of the mechanical operators can be stopped by issuing a command of release of the collective renewal during the collective renewal of the parameters. This allows that, even during the collective renewal, the collective renewal can be stopped at an arbitrary timing, whereby the device can be made to perform an appropriate process that suits the situation. Furthermore, since the values of the parameters correspond to the operation positions of the mechanical operators, the values of the parameters can be visually confirmed.

In addition, the aforementioned aspects of the present invention are also realized by computer programs.

DESCRIPTION OF THE PREFERRED EMBODIMENTS

Figure 1A:
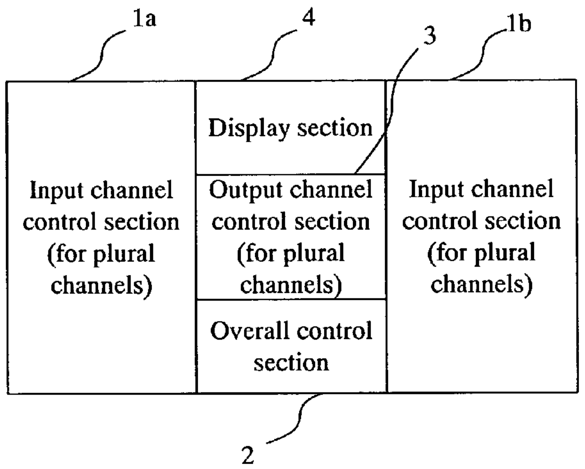
FIGS. 1A to 1C are explanatory views illustrating an operation panel according to one embodiment of the present invention.
Figure 1C:
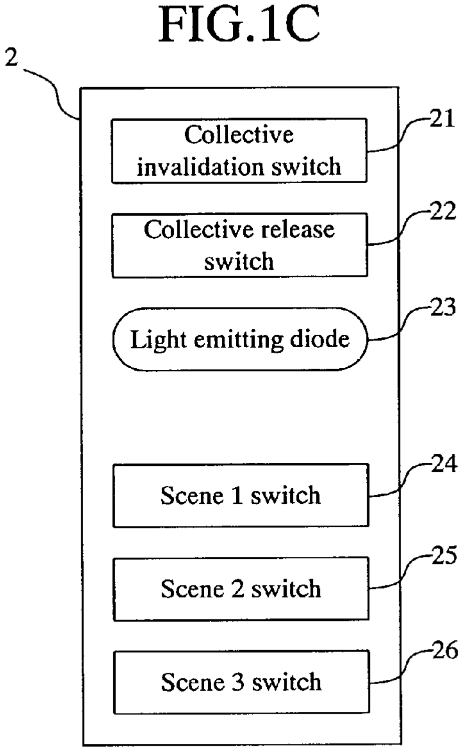
Figure 1B:
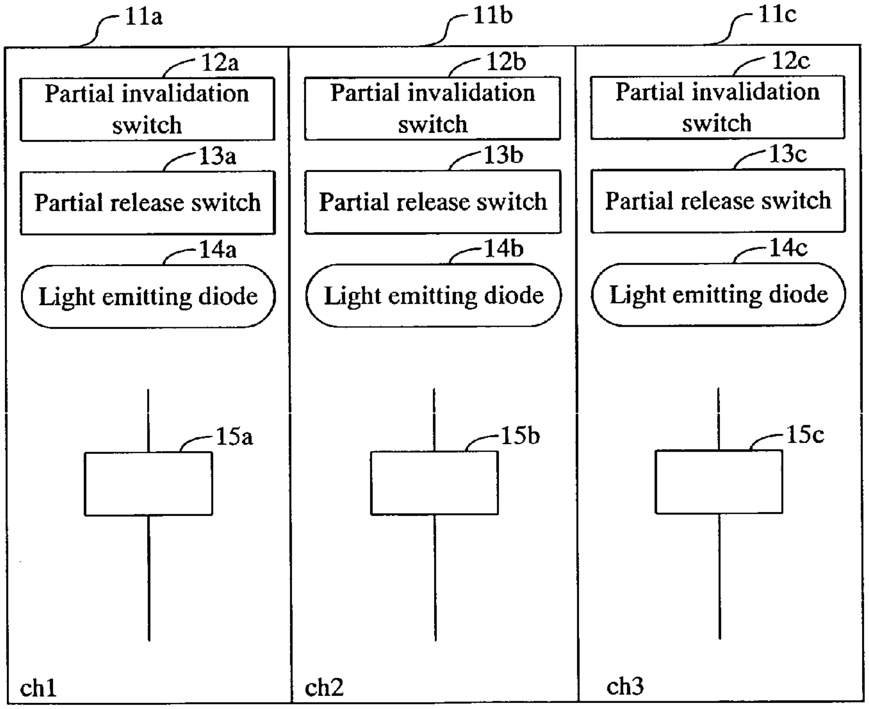
Figures 2A, 2B, 2C, 3:
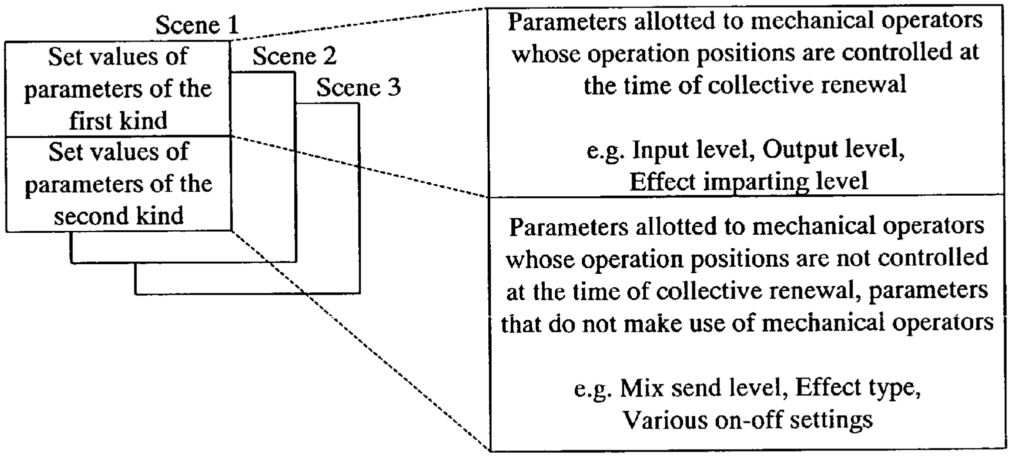
FIGS. 2A to 2C are explanatory views of flag registers used in one embodiment of the present invention.
FIG. 3 is an explanatory view of a scene data memory used in one embodiment of the present invention.

FIGS. 1A to 1C are explanatory views illustrating an operation panel according to one embodiment of the present invention; FIGS. 2A to 2C are explanatory views of flag registers; and FIG. 3 is an explanatory view of a scene data memory.

FIG. 1A is a view illustrating an operation panel of an audio mixing system. In FIG. 1A, input channel controlling sections 1*a*, 1*b*, overall controlling section 2, output channel controlling section 3, and display section 4 are shown.

FIG. 1B is a view in which individual input channel controllers in input channel controlling sections 1*a*, 1*b*, or individual output channel controllers in output channel controlling section 3, for three channels, are exemplified as partial controllers 11*a* to 11*c* for description.

In FIG. 1B, partial invalidation switches 12*a* to 12*c*, partial release switches 13*a* to 13*c*, light emitting diodes 14*a* to 14*c*, and faders 15*a* to 15*c* are shown.

Faders 15*a* to 15*c* are slider-type operators for linearly moving operation grips to set arbitrary parameters. Faders 15*a* to 15*c* are mechanical operators for changing the set values of level parameters in respective partial controllers 11*a* to 11*c* in a continuous manner. By manually operating the operation grips (members denoted with reference symbols 15*a* to 15*c* in FIG. 1B), values of the parameters are set in accordance with the positions (operation positions) of the operation grips. By making reference to the positions of operation grips, one can intuitively observe the values of the parameters with eyes.

Although not illustrated in FIG. 1B, a plurality of operators for setting the parameters are provided in addition to faders 15*a* to 15*c* in respective partial controllers 11*a* to 11*c*.

There are also virtual setting operators that are displayed on a display screen of display section 4. The virtual setting operators set parameters similar to the parameters set by the operators on the operation panel and other parameters.

When the values of the plurality of parameters are collectively renewed automatically by reading the later-mentioned scene data (referring to FIG. 3) out, the grip parts (operation positions) of faders 15*a* to 15*c* are controlled to be moved interlockingly with the values of the level parameters allotted to these faders. Specifically, the grip parts are driven by an electric motor.

Partial invalidation switches 12*a* to 12*c* are operators for setting the state (invalidation state) in which the operation positions of faders 15*a* to 15*c* are not controlled at the time of collective renewal of the parameters and for setting a state (invalidation standby state) in which an invalidation state is reserved before the collective renewal.

FIG. 2A illustrates a construction example of an invalidation standby register for ch1 to ch5. An "on" flag is set in channels that are in the invalidation standby state.

FIG. 2B illustrates a construction example of an invalidation register. An "on" flag is set in channels that are in the invalidation state.

When collective renewal is started, an "off" flag is set in the channels (for example, ch1) in which the "on" flag has been set in the invalidation standby register, and an "on" flag is set in the corresponding channels (ch1) in the invalidation register.

On the other hand, partial release switches 13*a* to 13*c* are operators for releasing the invalidation state of faders 15*a* to 15*c* when operated in the invalidation state. The operation positions of faders 15*a* to 15*c* are controlled to be moved to positions corresponding to the current values of the level parameters respectively allotted to faders 15*a* to 15*c*.

Further, when partial release switches 13*a* to 13*c* are operated during the collective renewal that is not an invalidation state, the partial release switches 13*a* to 13*c* let the operation positions of faders 15*a* to 15*c* stay at the current positions and let the parameters allotted to the respective faders retain the current values. In other words, partial release switches 13*a* to 13*c* in this case are operators for issuing a command of stopping of the collective renewal of the channels corresponding to partial controlling sections 11*a* to 11*c*.

Furthermore, when partial release switches 13*a* to 13*c* are operated before the collective renewal, partial operators 13*a* to 13*c* are operators that set a release standby state so that, with regard to faders 15*a* to 15*c* of the corresponding channels ch1 to ch3, the parameters will not be renewed even if the collective renewal is started.

FIG. 2C illustrates a construction example of a release standby register. When a release standby state is set, an "on" flag is set in the corresponding channels (for example, ch1) in the release standby register. If the "on" flag has been set in the registers of FIGS. 2A and 2B, these are set to "off" flags.

Light emitting diodes 14*a* to 14*c* indicate that the faders 15*a* to 15*c* of channels ch1 to ch3 are in the invalidation state by energization or repetition of energization/deenergization thereof.

FIG. 1C illustrates an overall controlling section 2. In FIG. 1C, a collective invalidation switch 21, a collective release switch 22, a light emitting diode 23, and scene selection switches 24 to 26 are shown. Scene selection switches 24 to 26 respectively select one scene data from a plurality of scene data (1) to (3) and collectively renewing the values of a plurality of parameters by reading the scene data out.

In FIG. 3, the scene data are shown by being classified into two kinds.

The parameters of the first kind are parameters allotted to mechanical operators of the type whose operation positions are controlled when the scene data are read out for collective renewal.

The mechanical operators whose operation positions are controlled are, for example, faders 15*a* to 15*c* illustrated in FIG. 1B. Besides these, the mechanical operators may be a rotation-type volume whose operation position (operation angle) can be controlled by motor driving, an on-off switch whose operation position can be controlled by motor driving, or the like.

The parameters of the second kind are parameters that are allotted to mechanical operators other than those of the above-mentioned type, or parameters that are set automatically or only by the virtual operators on display section 4 instead of being set by mechanical operators.

On the other hand, collective invalidation switch 21 illustrated in FIG. 1C is an operator for setting the aforementioned invalidation standby state when operated before the collective renewal. An "on" flag is set in all the channels of the invalidation standby register of FIG. 2A. At this time, when there is an "on" flag in FIGS. 2B and 2C, the flag is changed to an "off" flag.

Collective invalidation switch 21 is an operator for setting the faders 15*a* to 15*c*, . . . of all the channels to an invalidation state when operated after the collective renewal. An "on" flag is set in all the channels of the invalidation register of FIG. 2B. At this time, when there is an "on" flag in FIGS. 2A and 2C, the flag is changed to an "off" flag.

Collective release switch 22, when operated in an invalidation state, is an operator for releasing the invalidation state of faders 15*a* to 15*c*, . . . of all the channels, and for performing control so that the operation positions of faders 15*a* to 15*c*, . . . may be moved to positions corresponding to the current values of the parameters allotted to these.

Collective release switch 22, when operated during the collective renewal which is not an invalidation state, is an operator for letting the operation positions of faders 15*a* to 15*c*, . . . of all the channels stay at the current positions and for letting the parameters allotted to the respective faders retain the current values. In other words, collective release switch 22 in this case is an operator for issuing a command of stopping of the collective renewal of all the channels.

Collective release switch 22, when operated before the collective renewal, is an operator for setting the faders 15*a* to 15*c*, . . . of all the channels to a release standby state and for setting an "on" flag in all the channels of the release standby register of FIG. 2C. When the "on" flag has been set in the registers of FIGS. 2A and 2B, these are set to "off" flags. At the time of collective renewal, faders 15*a* to 15*c*, . . . of all the channels are prevented from undergoing collective renewal.

Light emitting diode 23 indicates that the faders 15*a* to 15*c*, . . . of all the channels are in the invalidation state by energization or repetition of energization/deenergization thereof.

Figure 4:
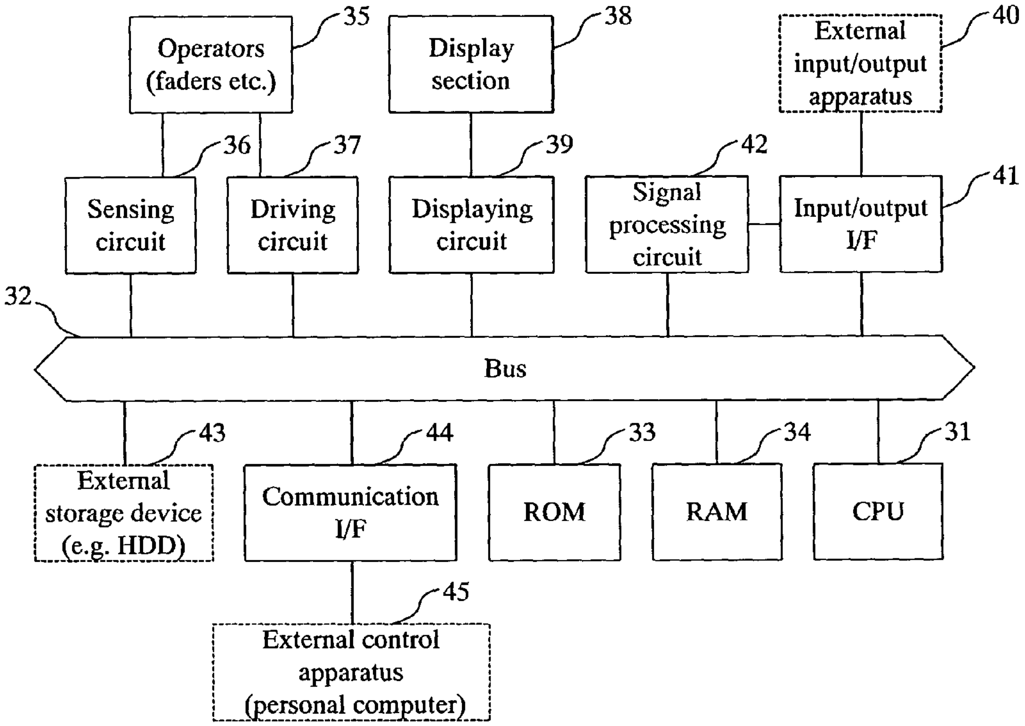
FIG. 4 is a block diagram illustrating a hardware construction example according to one embodiment of the present invention.

FIG. 4 is a block diagram illustrating a hardware construction example according to one embodiment of the present invention.

CPU 31 operates by using programs, setting data, and others stored in ROM 33 via bus 32, with the use of RAM 34 as a work area.

Operators 35 correspond to various switches and faders 15*a* to 15*c* illustrated in FIGS. 1B and 1C. Operators 35 may be a virtual operators displayed on display section 4. Sensing circuit 36 senses an operation state of operators 35 and outputs operation data relating to operators 35 to bus 32. Driving circuit 37 drives the operation grips of faders 15*a* to 15*c*.

Display section 38 corresponds to display section 4 illustrated in FIG. 1A and light emitting diodes 14*a* to 14*c*, 23 illustrated in FIGS. 1B and 1C. Displaying circuit 39 outputs display data to display section 38 through bus 32.

Audio data of a plurality of channels are input from external input/output apparatus 40 such as a microphone or a reproducing apparatus via input/output interface 41, and are subjected to a mixing signal process in signal processing circuit 42. The audio data are mixed in accordance with the control contents (contents of the parameters to be set) indicated by operation data of operator 35 or scene data. Signal processing circuit 42 is realized by a digital signal processor.

The flag registers shown in FIGS. 2A to 2C are provided in RAM 34. The scene data shown in FIG. 3 are stored into and read out from ROM 33 or RAM 34. The mixed audio data of a plurality of output channels are output to external input/output apparatus 40 such as a speaker or a recording apparatus via input/output interface 41.

A memory card, a hard magnetic disk drive, a CD-ROM drive, or the like can be disposed as external storage device 43, whereby the input audio data and the mixed audio data can be stored and read out.

Control programs such as an operating system program for operating CPU 31 or a setting renewal program according to one embodiment of the present invention, setting data, and others can be stored in external storage device 43 and can be read out into RAM 34. Addition, version upgrading, and the like of control programs and setting data can be easily carried out.

Communication interface 44 is connected to external controlling apparatus 45 such as a personal computer. Some external controlling apparatus 45 execute controlling functions executed by using operators 35 or display section 38, in the same manner as CPU 31. The connection may be direct coupling connection, one conforming to a local area network, or one conforming to a wide area network. External storage device 43 can download control programs and various data from a server computer.

In the above description, a method of reading the scene data out from a memory is adopted. Besides this, one can receive scene data from outside via communication I/F 44. Also, one can adopt a method in which a plurality of parameters are simultaneously reflected by receiving the values of the plurality of parameters at each time point during the collective renewal, from outside to the present device.

The above description has been given based on an assumption that the set parameters (digital values) are transferred to signal processing circuit 42 that incorporates a data signal processor therein, and the digital audio signals input from input/output I/F 41 are digitally subjected to signal processing.

Instead of this, the mixing device may be a digital control type analog mixing apparatus in which signal processing circuit 42 is made of an analog electronic circuit using an operation amplifier, and the control amount of this analog electronic circuit is controlled by the set parameters (digital values).

FIG. 5 and FIGS. 6A to 6F are flowcharts showing an operation example according to one embodiment of the present invention. CPU 31 and a personal computer, which is or external controlling apparatus 45 illustrated in FIG. 4, execute a setting renewal program. In later description, CPU 31 and the personal computer are simply referred to as a computer.

First, an interruption process will be described with reference to FIG. 5.

By execution of the programs in FIGS. 6A to 6F, start or stop of this interruption process is requested for each channel, and the interruption process is carried out for each channel.

Once the interruption process is started, the interruption process is started at every predetermined time interval. When the value of the parameter reaches the final value, the interruption process is stopped.

In S51, the value of a parameter that needs to be renewed is renewed by its renewal amount. The renewal amount may be, for example, as follows.

Renewal amount={(final value of collective renewal)−(current value at the time of start of collective renewal)}×(interruption interval)/(renewal time)

In S52, the renewed value of the parameter is sent to signal processing circuit 42 illustrated in FIG. 4. In S53, driving circuit 37 is controlled so that the operation position of the fader will be the position corresponding to the renewed value of the parameter allotted to this fader, whereby the fader is moved to the corresponding position and the one interruption process is ended.

Next, description will be given by making reference to FIGS. 6A to 6F.

When a pressing operation of collective invalidation switch 21 is detected in S61, the procedure goes to S62. If the current process is not during the execution of collective renewal, all the channels are set to invalidation standby state in S63.

On the other hand, if the current process is under execution of collective renewal in S62, the collective renewal of all the channels is stopped in S65. In S66, the parameters of all the channels are renewed to final values. In S67, all the channels are set to an invalidation state.

Figure 6A:
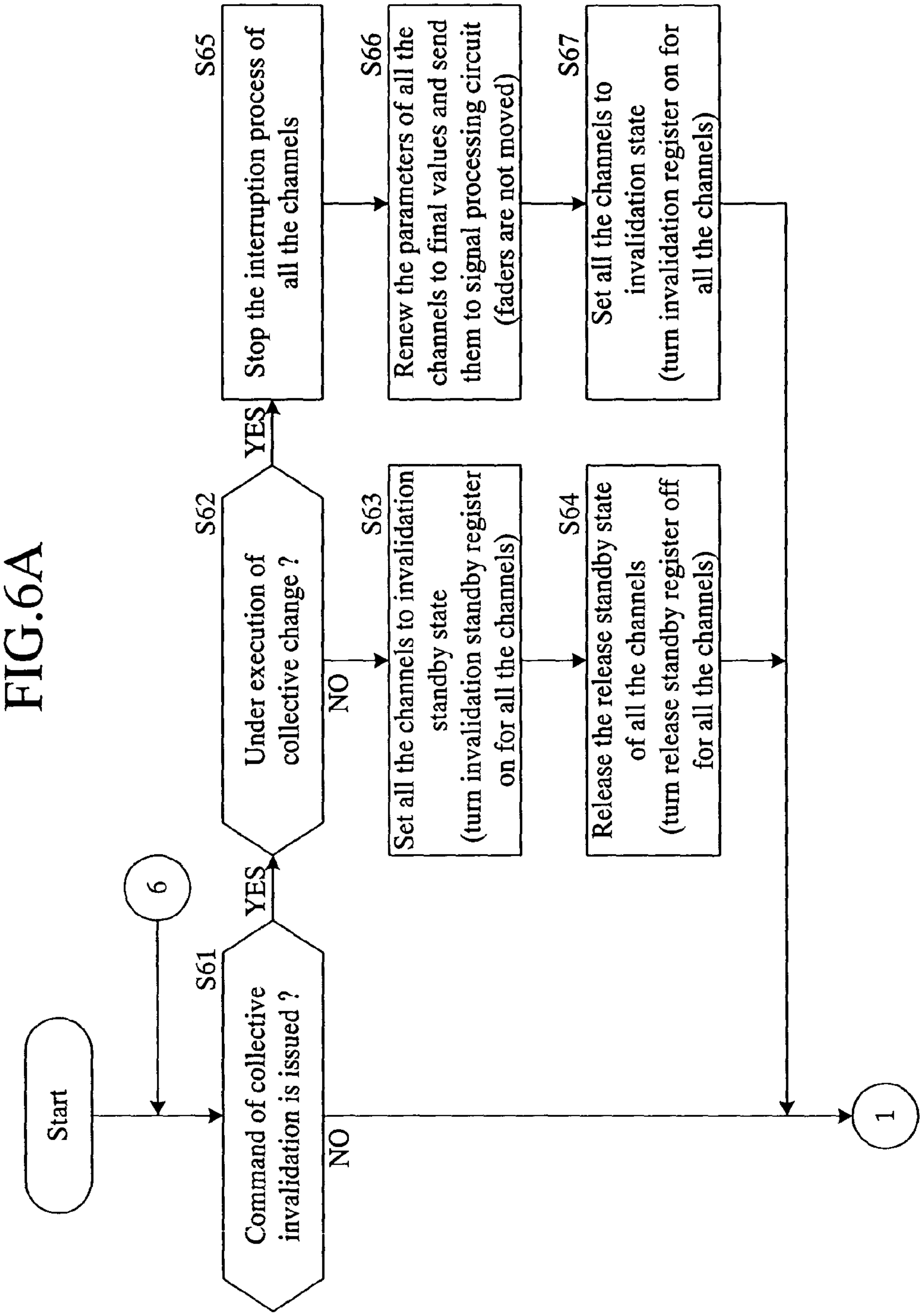
FIGS. 6A to 6F are the second flowchart showing an operation example according to one embodiment of the present invention.
Figure 6B:
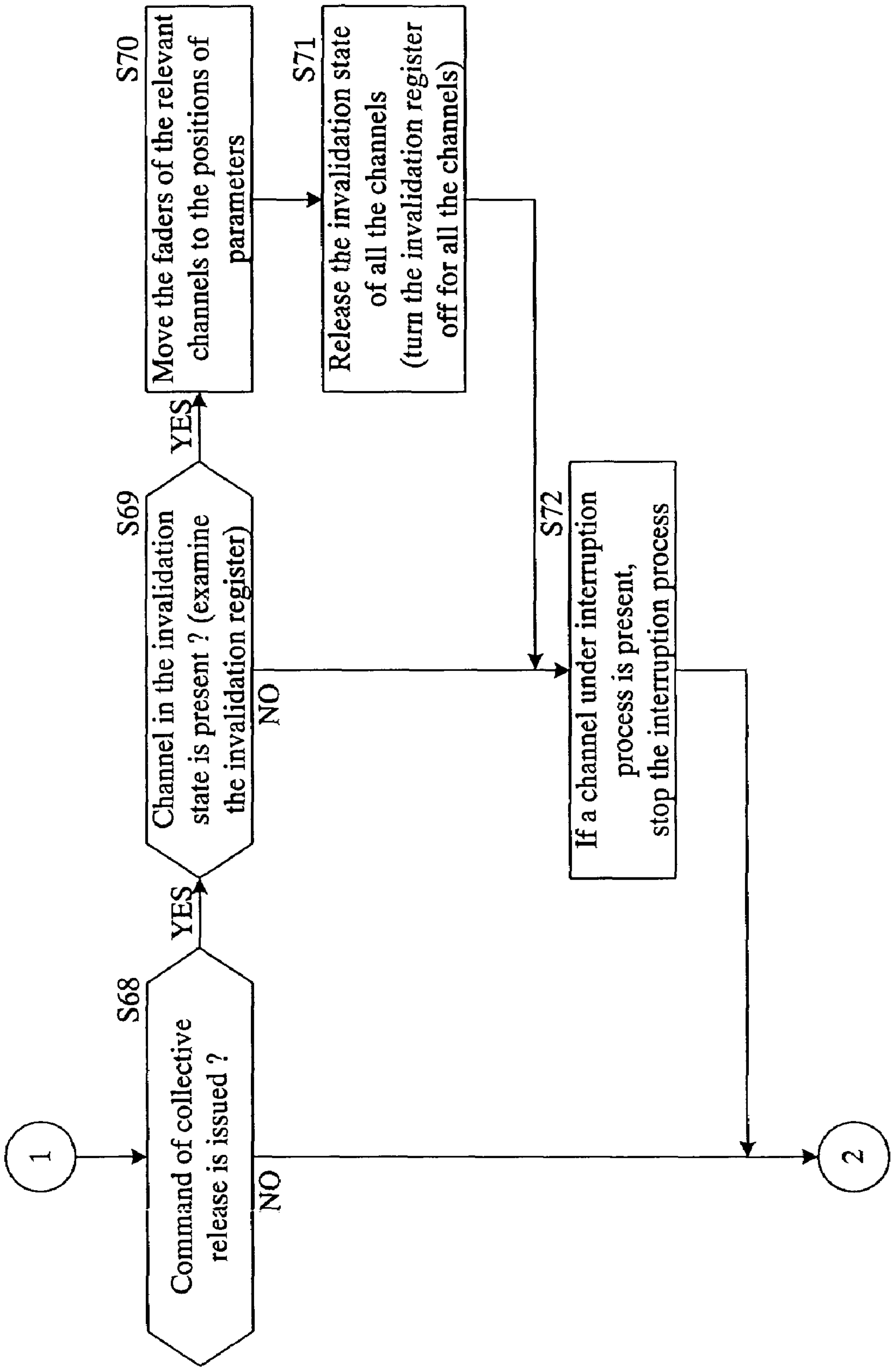

When a pressing operation of collective release switch 22 is detected in S68 of FIG. 6B and if a channel (for example, ch1) in the invalidation state is present, the driving circuit 37 is controlled so that the operation grip of fader 15*a* of the channel (ch1) will be at the position corresponding to the current value of the parameter in S70, and the invalidation state of all the channels is released in S71.

If no channel in the invalidation state is present in S69, or else if the process of S71 is ended, the procedure goes to S72. If a channel under an interruption process is present, the interruption process of FIG. 5 is stopped and, as a result, the collective renewal of all the channels is stopped.

Figure 6C:
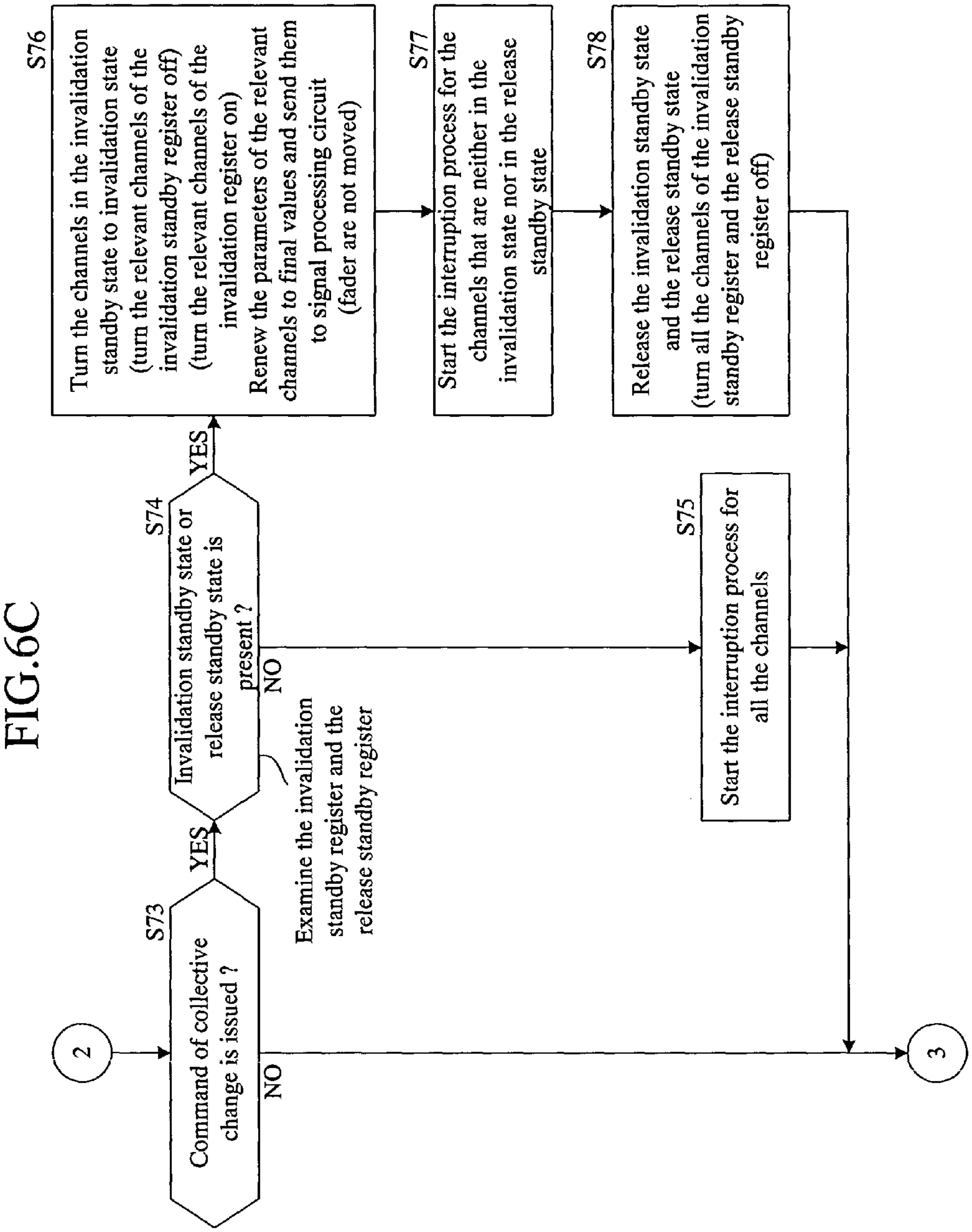

If issuance of a command of collective renewal is detected by pressing of any one of scene selection switches 24 to 26 of FIG. 1C in S73 of FIG. 6C, the procedure goes to S74, where the computer determines whether or not there is at least one channel in the invalidation standby state or in the release standby state.

Figure 5:
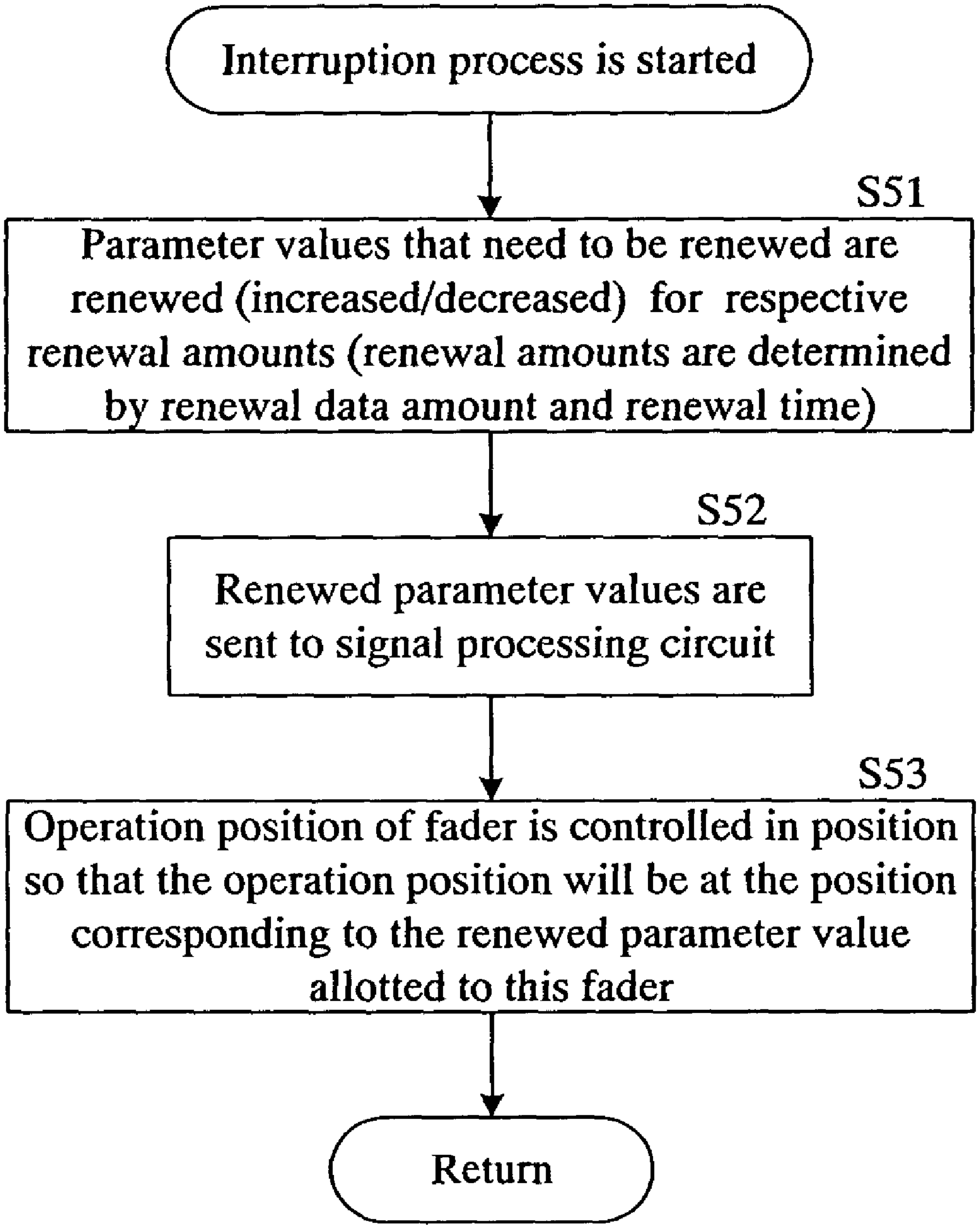
FIG. 5 is the first flowchart showing an operation example according to one embodiment of the present invention.

If there is no channel in the invalidation standby state or in the release standby state, the interruption process of FIG. 5 is started for all the channels in S75.

On the other hand, if a channel in the invalidation standby state or in the release standby state is present, and if there is a channel (for example ch1) in the invalidation standby state in S76, the fader 15*a* of the relevant channel is set to the invalidation state. The parameter of the relevant channel is renewed to the final value. However, the operation position of the fader 15*a* is not moved.

In S77, the interruption process of FIG. 5 is started for channels that are neither in the invalidation state nor in the release standby state. In other words, for the channels that are in the invalidation standby state or in the release standby state, the renewal operation is not carried out even if a command of collective renewal is issued.

In S78, the invalidation standby state and the release standby state of all the channels is released.

Figure 6D:
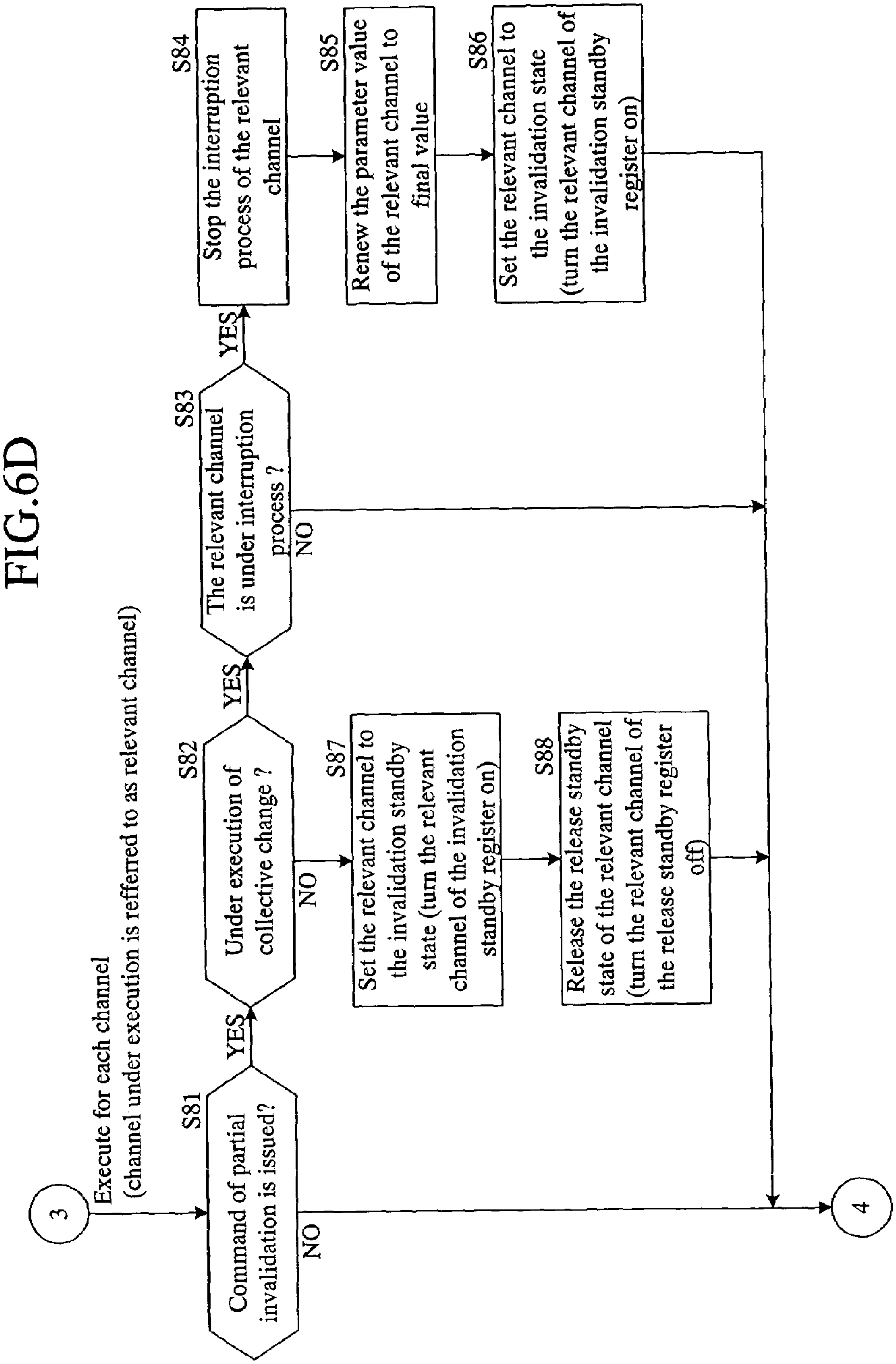

Next, description will be given by making reference to FIGS. 6D and 6E.

In S81 to S88, the processes are carried out for each channel. In S81, the computer determines whether a command of partial invalidation has been issued or not. For example, if partial invalidation switch 12*a* is operated by pressing, the procedure goes to S82. If the current process is under execution of collective renewal (under execution of the interruption process of FIG. 5) in any one channel, the procedure goes to S83.

In S83, if the current process is under execution of collective renewal in the relevant channel for which the command of partial invalidation is issued in S81, the interruption process of FIG. 5 is stopped for the relevant channel in S84; the parameter of the relevant channel is renewed to the final value of the scene data in S85; and the relevant channel is set to the invalidation state in S86.

On the other hand, if no channel is under execution of collective renewal in S82, the relevant channel is set to the invalidation standby state in S87, and the release standby state is released in S88 by considering the case in which the relevant channel is in the release standby state.

In S89 to S94, the processes are executed also for each channel.

Figure 6E:
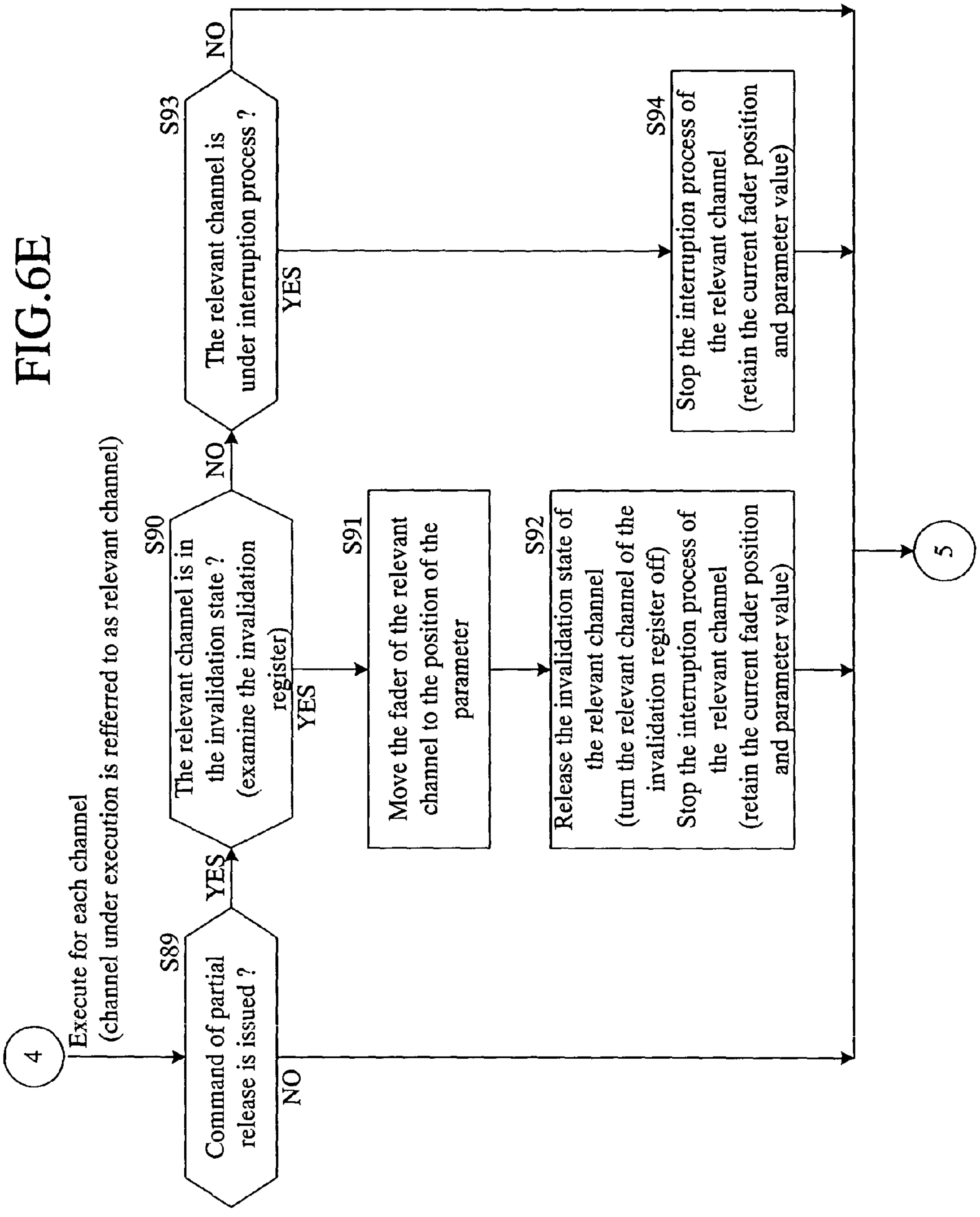

In S89 of FIG. 6E, the computer determines whether a command of partial release has been issued or not. For example, if partial release switch 13*a* illustrated in FIG. 1B has been operated by pressing, the procedure goes to S90. If the relevant channel is in the invalidation state, the operation grip (operation position) of fader 15*a* of the relevant channel is moved to the position corresponding to the current value of the parameter allotted to fader 15*a*.

In S92, the invalidation state of the relevant channel is released, and the interruption process is stopped. The position of the operation grip of fader 15*a* of the relevant channel is maintained at the current position, and the value of the parameter allotted to fader 15*a* is retained at the current value.

On the other hand, if the relevant channel is not in the invalidation state in S90, and if the relevant channel is under execution of collective renewal (under the interruption process of FIG. 5) in S93, the interruption process of the relevant channel is stopped in S94. The position of the operation grip of fader 15*a* of the relevant channel is maintained at the current position, and the value of the parameter allotted to fader 15*a* is retained at the current value.

In S95, other processes are carried out. For example, collective release standby is set in which the release is reserved while the collective renewal is not being executed. In the case where release standby performed for each channel is to be set, the release standby is set in the same manner for the relevant channel.

In S96, when a command of stop of the operation of the device is issued by an operator (not illustrated), the process is ended, or else the process is returned to S61 of FIG. 6A.

Here, control of energization of light emitting diodes 14*a* to 14*c* of partial controllers 11*a* to 11*c* illustrated in FIG. 1B and light emitting diode 23 of overall controlling section 2 illustrated in FIG. 1C will be described.

Light emitting diode 23 is energized when all the channels are in an invalidation state, and light emitting diodes 14*a* to 14*c* are energized when their own respective channels are in an invalidation state. Light emitting diode 23 may be energized when all the channels are in an invalidation standby state, and may be repeatedly energized/deenergized when all the channels are in an invalidation state. Also, light emitting diodes 14*a* to 14*c* may be controlled to display in a similar manner with regard to their own respective channels.

Any displayer and any display controlling means may be used as long as they display an invalidation state and/or invalidation standby state to the user. For example, one may adopt character display using a 7-segment light emitting diode.

The aforementioned display control can be realized by being incorporated in the flowcharts shown in FIG. 5 and FIGS. 6A to 6F or by examining the flags of the invalidation register shown in FIG. 2B and, if necessary, the invalidation standby register shown in FIG. 2B in a different flowchart that operates in parallel.

FIGS. 7A to 7E are explanatory views conceptually showing operation examples according to one embodiment of the present invention.

They show a value of the parameter allotted to fader 15*a* of one channel (for example, ch1). The solid line represents the current value of the parameter, and the broken line represents the operation position of the fader.

Figures 7A, 7B, 7C, 7D, 7E:
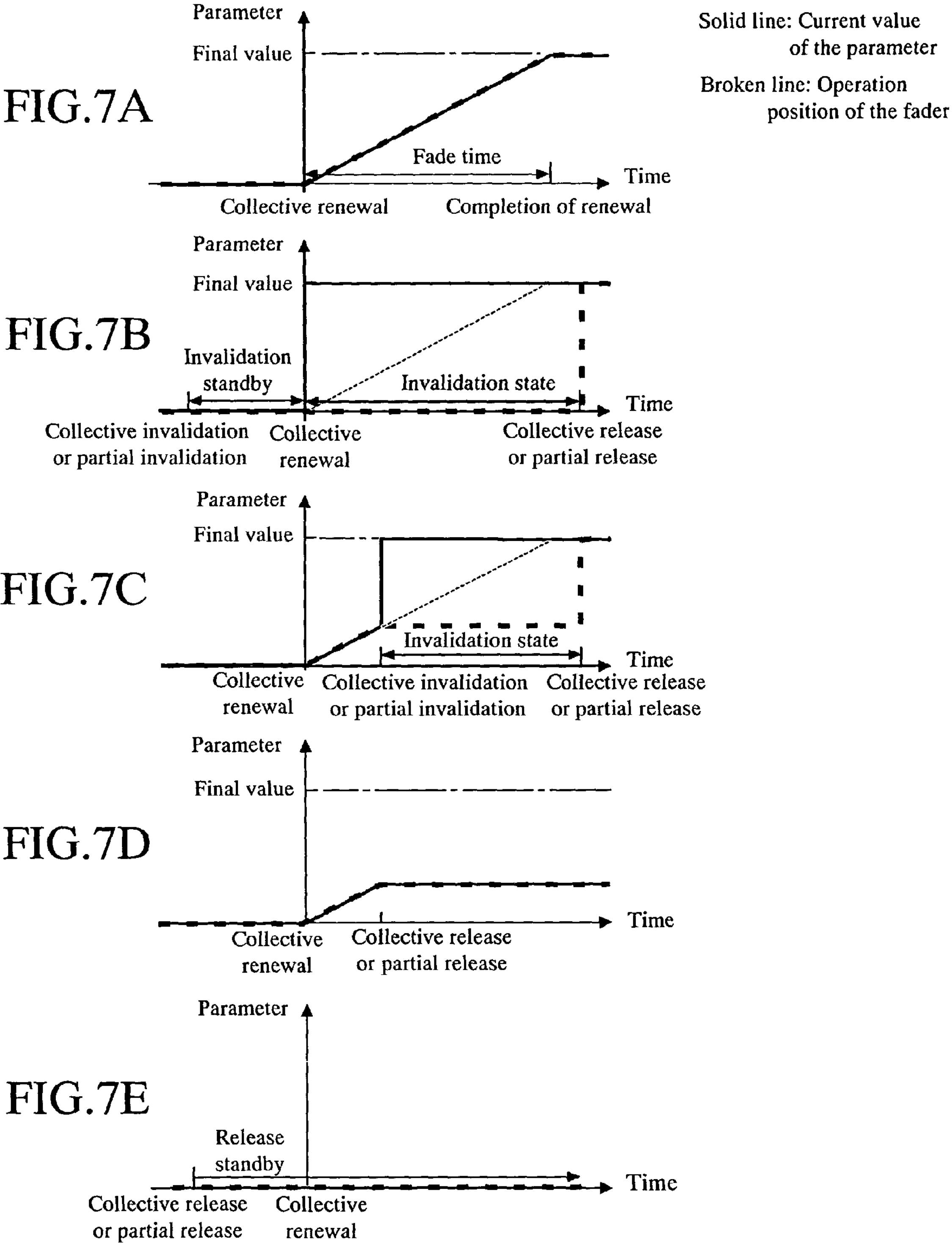
FIGS. 7A to 7E are explanatory views conceptually showing operation examples according to one embodiment of the present invention.

FIG. 7A shows a case in which the collective renewal switch (for example, scene selection switch 24) is operated in a state where none of collective invalidation switch 21, collective release switch 22, and others are operated. The procedure goes through S61-S68-S73-S74-S75 of FIG. 6A to 6C. When collective renewal is started, the value of the parameter is renewed in a predetermined period of time that is set as a fade time until the value reaches the scene data set value (final value). During this period, the position of the operation grip is driven and automatically controlled so that the operation position of fader 15*a* will be the position corresponding to the current value of the parameter that is allotted thereto.

FIG. 7B shows a case in which the current state is set at an invalidation standby state in advance by operation of collective invalidation switch 21 or partial invalidation switch 12*a*. The mechanical noises accompanying the driving of the operation grip of fader 15*a* can be restrained.

In the case where collective invalidation switch 21 is operated while the scene data are not read out (while the interruption process is not started at all), the procedure goes through S61-S62-S63-S64 of FIG. 6A. In the case where partial invalidation switch 12*a* is operated, the procedure goes through S81-S82-S87-S88 of FIG. 6D.

Next, by operation of the collective renewal switch, the parameter allotted to fader 15*a* is renewed to the final value. In other words, the parameter is renewed toward the final value with the renewal time being zero. During this period, the position control of the operation grip of fader 15*a* is invalidated, so that the operation position does not correspond to the value of the parameter.

The procedure goes through S73-S74-S76-S77-S78 of FIG. 6C. Here, when collective invalidation switch 21 is not operated the operation shown in FIG. 7A is carried out regarding the other channels for which partial invalidation switches 12*b*, 12*c* are not operated.

When partial release switch 13*a* is operated in this invalidation state, the invalidation state of fader 15*a* is released, and the operation grip of fader 15*a* is controlled to be moved to the position corresponding to the current value (which now is the final value) of the corresponding parameter. The interruption process for ch1 shown in FIG. 5 is stopped.

The procedure goes through S89-S90-S91-S92 of FIG. 6E.

Here, when faders 15*a* to 15*c* of a plurality of channels are in an invalidation state, the invalidation state of any one of faders 15*a* to 15*c* can be released by selecting the corresponding one of partial release switches 13*a* to 13*c*.

On the other hand, when collective release switch 22 is operated in an invalidation state, the invalidation state of all the faders including faders 15*a* to 15*c* is released as well, and the operation grips of the faders are controlled to be moved to the positions corresponding to the current values (which now are the final values) of the corresponding parameters. At the same time, the collective renewal process (interruption process) for all the channels is stopped. The procedure goes through S68-S69-S70-S71-S72 of FIG. 6B.

FIG. 7C shows a case in which the collective renewal switch is operated in a state where none of collective invalidation switch 21, collective release switch 22, and others are operated, and thereafter collective invalidation switch 21 or partial invalidation switch 12*a* is operated. From the midway of collective renewal, the mechanical noises accompanying the driving of the operation grip of fader 15*a* can be restrained. Else, depending on the current situation, if the user wishes to complete the collective renewal (to renew the parameter to the final value) at an arbitrary timing during the collective renewal, the completion can be realized by the above-described operation.

The beginning is similar to that of FIG. 7A. Operation of collective invalidation switch 21 or partial invalidation switch 12*a* gives rise to an invalidation state similar to that of FIG. 7B. Also, when partial release switch 13*a* is operated or when collective release switch 22 is operated, the device will be controlled in a manner similar to that of FIG. 7B.

When collective invalidation switch 21 is operated, the procedure goes through S61-S62-S65-S66-S67 of FIG. 6A. When partial invalidation switch 12*a* is operated, the procedure goes through S81-S82-S83-S84-S85-S86 of FIG. 6D.

FIG. 7D shows a case in which the collective renewal switch (scene selection switch 24) is operated in a state where none of collective invalidation switch 21, collective release switch 22, and others are operated, and thereafter collective release switch 22 or partial release switch 13*a* is operated.

Even during the collective renewal, the collective renewal can be stopped at an arbitrary timing in a state in which the current value in the midst of collective renewal is retained, so that the renewal process can be carried out appropriately in accordance with the current situation. Further, from the midway of collective renewal, the mechanical noises accompanying the driving of the operation grip of fader 15*a* can be restrained by the above-described operation.

Unlike the cases of FIGS. 7B and 7C, collective release switch 22 or partial release switch 13*a* is not associated with the invalidation state, but is an operator for performing stopping of the collective renewal process.

The beginning is similar to that of FIG. 7A. When partial release switch 13*a* is operated, the interruption process for ch1 shown in FIG. 5 is stopped. The procedure goes through S89-S90-S93-S94 of FIG. 6E.

On the other hand, when collective release switch 22 is operated, the interruption process is stopped for all the channels. The procedure goes through S68-S69-S72 of FIG. 6B.

FIG. 7E shows a case in which the collective renewal switch is operated while collective release switch 22 or partial release switch 13*a* is operated to give rise to a release standby state.

In this case, if collective release switch 22 has been operated, the interruption process of FIG. 5 will not be executed even if the collective renewal switch is operated. If partial release switch 13*a* has been operated, the interruption process for the relevant channel (ch1) will not be executed.

Figure 6F:
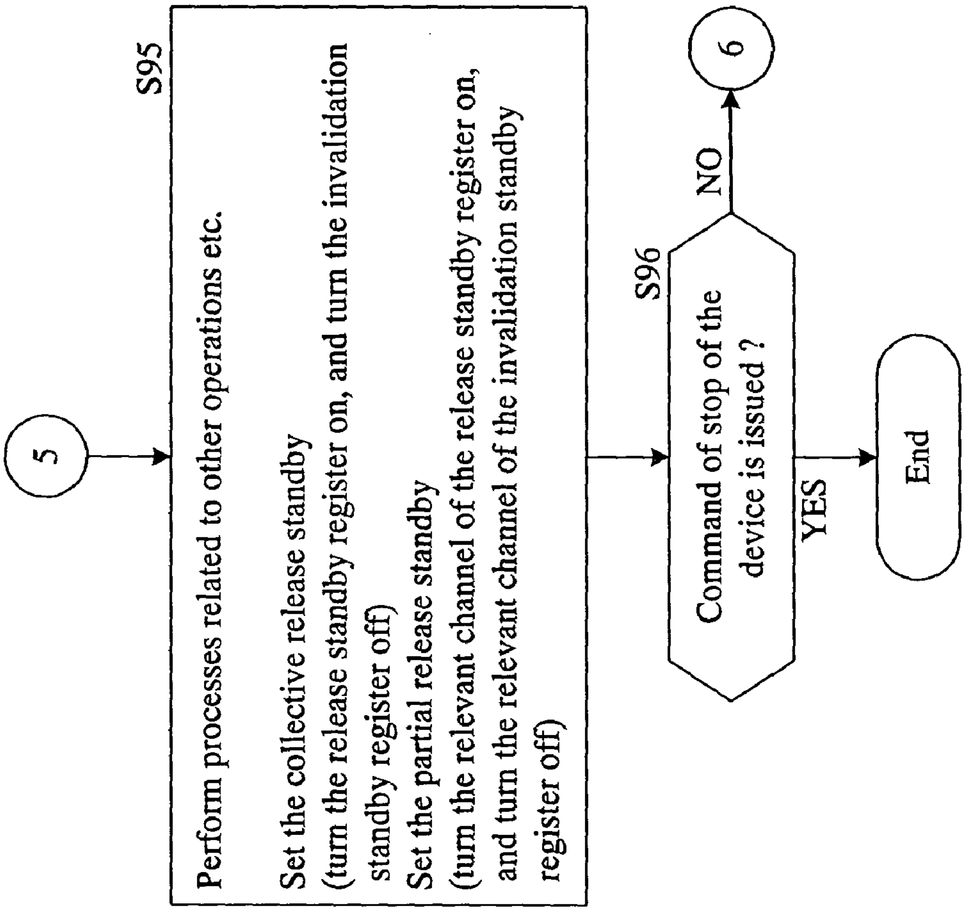

The release standby is set in S95 of FIG. 6F, and the procedure goes through S73-S74-S76-S77-S78 of FIG. 6C.

In the above description, operation of the collective renewal switch in FIG. 7B or operation of collective invalidation switch 21 or partial invalidation switch 12*a* in FIG. 7C gives rise to an invalidation state and, at the same time, the value of the parameter is immediately renewed to the final value. For example, the collective renewal is carried out with the fade time being zero.

Instead of this, in order to restrain the mechanical noises accompanying the driving of the operation grip of fader 15*a*, the values of the parameters may be collectively renewed towards the final values with the previously set fade time maintained as it is, as shown by fine broken lines in FIGS. 7B and 7C, simultaneously when the invalidation state is brought about.

For example, the steps of S65 of FIGS. 6A and S74 of FIG. 6C are not executed, so that the interruption process is not stopped. If the current state is an invalidation state, the operation position determined in S53 of the flowchart of the interruption process of FIG. 5 may not be reflected on the operation position control of the fader (the fader is maintained at the current position).

In FIGS. 7B and 7C, the operation of collective release switch 22 or partial release switch 13*a* may be carried out when a usage environment is achieved in which the mechanical noises are not harsh to ears.

On that occasion, in the illustrated example, at the time of release, the operation position is immediately moved to the position corresponding to the current value of the parameter: however, one may set a period of time (position adjusting time) through which the operation position is moved to the position corresponding to the current value of the parameter. The magnitude of the operation sound accompanying the position adjustment can be decreased by making the position adjusting time be comparatively long, for example, longer than the fade time of the parameter.

Further, in order to release the invalidation state of a predetermined channel (for example, ch1), the user may make physical contact to the operation section (operation grip) of fader 15*a* of the relevant channel (the physical contact is sensed, for example, by using a touch sensor such as a piezoelectric sensor), or the user may move fader 15*a* slightly (the change of the set value of the fader is sensed) to release the invalidation state.

On the other hand, in FIG. 7D, instead of an operation of partial release switch 13*a* of a predetermined channel (for example, ch1), the user may make physical contact to the operation section (operation grip) of fader 15*a* of the relevant channel, or the user may move fader 15*a* slightly to stop the collective renewal.

The operability will be improved by allowing manual setting with the use of the fader immediately after the parameter value is renewed to the final value and the interruption process is stopped by operation of the collective invalidation switch or the partial invalidation switch in FIGS. 7B and 7C or after the collective renewal process (interruption process) is stopped by operation of the collective release switch or the partial release switch in FIGS. 7B, 7C and 7D (in the case of FIGS. 7B and 7C, the position adjustment of the operation position in accordance with the value of the parameter is also completed).

In the above description, one fader is provided for each channel, and the partial invalidation standby state, partial invalidation state, and partial release standby state are set for each channel.

In contrast, if a plurality of mechanical operators whose operation positions are controlled at the time of reading the scene data out are provided for each channel, the partial invalidation standby state, partial invalidation state, and partial release standby state may be set for each one of such mechanical operators instead of the setting for each channel such as described above.

Furthermore, the overall controlling section 2 illustrated in FIG. 1C may be provided with a manual setting operator, for example, a rotary encoder or the like. When the user switches from the automatic collective renewal mode to the manual collective renewal mode and operates the rotary encoder, the values of the parameters of a plurality of channels can be collectively renewed interlockingly towards the final values read out as scene data.

In the case of such a manual collective renewal mode as well, the operation position of the mechanical operator for each channel can be controlled, and various functions such as collective or partial invalidation standby, invalidation, release standby, and release can be given in the same manner as in the above-described embodiment.

The parameter setting device according to the present invention can be applied not only to audio mixing apparatus having numerous operators but also to apparatus provided with an operation panel having numerous operators for setting plural kinds of parameters, for example, an electronic musical instrument (the scene data are also referred to as registration data) or an amusement game apparatus (particularly a musical instrument playing game apparatus).

What is claimed is:

1. A parameter setting device comprising:

a plurality of mechanical operators to which a plurality of parameters are respectively allotted, said mechanical operators respectively setting values of the parameters in accordance with respective operation positions;

a collective renewal data memory that stores collective renewal data for collectively renewing the values of said plurality of parameters;

a collective renewal controlling section for respectively allowing change of the values of said plurality of parameters in accordance with lapse of time to values represented by said collective renewal data upon command of collective renewal, and for respectively allowing movement of the respective operation positions of said plurality of parameters that are changed in accordance with lapse of time;

an invalidation command issuing section for issuing a command of invalidation of said plurality of mechanical operators; and an invalidation controlling section for setting the values of said plurality of parameters to the values represented by said collective renewal date and for stopping the movement of said plurality of mechanical operators when the command on invalidation of said plurality of mechanical operators is issued by said invalidation command issuing section during the change of the values of the parameters and the movement of the operation positions of the mechanical operators by said collective renewal controlling section.

2. The parameter setting device according to claim 1, wherein said invalidation command issuing section is provided commonly for said plurality of mechanical operators and is constructed with one invalidation operator that commonly issues a command of invalidation of said plurality of mechanical operators, and said invalidation controlling section commonly controls setting of the values of said plurality of parameters and stopping of the movement of said plurality of mechanical operators in response to operation of said invalidation operator.

3. The parameter setting device according to claim 1, wherein said invalidation command issuing section is provided in respective correspondence to said plurality of mechanical operators and is constructed with a plurality of invalidation operators that respectively issue commands of invalidation of said plurality of mechanical operators independently, and said invalidation controlling section controls setting of the values of said plurality of parameters and stopping of the movement of said plurality of mechanical operators individually in response to respective operation of said plurality of invalidation operators.

4. The parameter setting device according to claim 1, further comprising:

a release command issuing section for issuing a command of release of the invalidation of a part of or all of said plurality of mechanical operators; and a release controlling section for allowing movement of mechanical operators to which the command of release of the invalidation is issued, to operation positions corresponding to the values of the parameters allotted to the mechanical operators in response to the command of release of the invalidation by said release command issuing section.

5. The parameter setting device according to claim 4, wherein said release command issuing section is an exclusive-use operator for issuing a command of release of the invalidation of a part of or all of said plurality of mechanical operators.

6. The parameter setting device according to claim 4, wherein said release command issuing section senses physical contact to said plurality of mechanical operators or displacement of said plurality of mechanical operators, and issues a command of release of the invalidation of mechanical operators for which the physical contact or displacement has been sensed upon sensing the physical contact or displacement.

7. A parameter setting device comprising:

a plurality of mechanical operators to .which a plurality of parameters are respectively allotted, said mechanical operators respectively setting values of the parameters in accordance with respective operation positions;

a collective renewal data memory that stores collective renewal data for collectively renewing the values of said plurality of parameters;

a collective renewal controlling section for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time;

an invalidation command issuing section for issuing a command of invalidation of said plurality of mechanical operators;

an invalidation standby state setting section for setting the plurality of mechanical operators to an invalidation standby state when the command of invalidation of the plurality of mechanical operators is issued by said invalidation command issuing section in a state in which the values of the parameters are not changed and the operation positions of the mechanical operators are not moved by said collective renewal controlling section; and an invalidation controlling section for setting the values of the parameters, which are allotted to said plurality of mechanical operations, to the values represented by said collective renewal data and for prohibiting the movement of said plurality of mechanical operators when said command of collective renewal is issued in a state in which the plurality of mechanical operators are set to the invalidation standby state by said invalidation standby state setting section.

8. The parameter setting device according to claim 7, wherein said invalidation command issuing section is provided commonly for said plurality of mechanical operators and is constructed with one invalidation operator that commonly issues a command of invalidation of said plurality of mechanical operators, and said invalidation standby state setting section commonly sets the plurality of mechanical operators to an invalidation standby state in response to operation of said invalidation operator in a state in which the values of the parameters are not changed and the operation positions of the mechanical operators are not moved by said collective renewal controlling section.

9. The parameter setting device according to claim 7, wherein said invalidation command issuing section is provided in respective correspondence to said plurality of mechanical operators and is constructed with a plurality of invalidation operators that respectively issue commands of invalidation of said plurality of mechanical operators independently, and said invalidation standby state setting section sets the plurality of mechanical operators to an invalidation standby state individually in response to a respective operation of said plurality of invalidation operators in a state in which the values of the parameters are not changed and the operation positions of the mechanical operators are not moved by said collective renewal controlling section.

10. The parameter setting device according to claim 7, further comprising:

a release command issuing section for issuing a command of release of the invalidation of a part of or all of said plurality of mechanical operators; and a release controlling section for allowing movement of mechanical operators to which the command of release of the invalidation is issued, to operation positions corresponding to the values of the parameters allotted to the mechanical operators in response to the command of release of the invalidation by said release command issuing section.

11. The parameter setting device according to claim 10, wherein said release command issuing section is an exclusive-use operator for issuing a command of release of the invalidation of a part of or all of said plurality of mechanical operators.

12. The parameter setting device according to claim 10, wherein said release command issuing section senses physical contact to said plurality of mechanical operators or displacement of said plurality of mechanical operators, and issues a command of release of the invalidation of mechanical operators for which the physical contact or displacement has been sensed upon sensing the physical contact or displacement.

13. A parameter setting device comprising:

a plurality of mechanical operators to which a plurality of parameters are respectively allotted, said mechanical operators respectively setting values of the parameters in accordance with respective operation positions;

a collective renewal data memory that stores collective renewal data for collectively renewing the values of said plurality of parameters;

a collective renewal controlling section for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time;

a release command issuing section for issuing a command of release of the collective renewal of the values of said plurality of parameters; and a release controlling section for stopping the change of the values of said plurality of parameters and for stopping the movement of said plurality of mechanical operators when the command of release of the collective renewal is issued by said release command issuing section during the change of the values of the parameters and the movement of the operation positions of the mechanical operators by said collective renewal controlling sections, wherein said release command issuing section is provided in respective correspondence to said plurality of parameters and is constructed with a plurality of release operators that respectively issue commands of release of the collective renewal of the values of said plurality of parameters independently, and said release controlling section controls stopping of the change of the values of said plurality of parameters and stopping of the movement of said plurality of mechanical operators individually in response to respective operation of said plurality of release operators.

14. A computer-readable medium having a computer program applied to a parameter setting device having a plurality of mechanical operators to which a plurality of parameters are respectively allotted, said mechanical operators respectively setting values of the parameters in accordance with respective operation positions, and a collective renewal data memory that stores collective renewal data for collectively renewing the values of said plurality of parameters, wherein the computer program causes the parameter setting device to execute a method comprising:

a collective renewal controlling step for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time; and an invalidation controlling step for setting the values of said plurality of parameters to the values represented by said collective renewal data and for stopping the movement of said plurality of mechanical operators when a command of invalidation of said plurality of mechanical operators is issued during the change of the values of the parameters and the movement of the operation positions of the mechanical operators by said collective renewal controlling step.

15. A computer-readable medium having a computer program applied to a parameter setting device having a plurality of mechanical operators to which a plurality of parameters are respectively allotted, said mechanical operators respectively setting values of the parameters in accordance with respective operation positions, and a collective renewal data memory that stores collective renewal data for collectively renewing the values of said plurality of parameters, wherein the computer program causes the parameter setting device to execute a method comprising:

a collective renewal controlling step for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time;

an invalidation standby state setting step for setting the plurality of mechanical operators to an invalidation standby state when a command of invalidation of the plurality of mechanical operators is issued before execution of said collective renewal controlling step; and an invalidation controlling step for setting the values of the parameters, which are allotted to said plurality of mechanical operators, to the values represented by said collective renewal data and for prohibiting the movement of said plurality of mechanical operators When said command of collective renewal is issued in a state in which the plurality of mechanical operators are set to the invalidation standby state by said invalidation standby state setting step.

16. A computer-readable medium having a computer program applied to a parameter setting device having a plurality of mechanical operators to which a plurality of parameters are respectively allotted, said mechanical operators respectively setting values of the parameters in accordance with respective operation positions, a collective renewal data memory that stores collective renewal data for collectively renewing the values of said plurality of parameters, and a plurality of release operators that respectively issue commands of release of the collective renewal of the values of said plurality of parameters independently, wherein the computer program causes the parameter setting device to execute a method comprising:

a collective renewal controlling step for respectively allowing change of the values of said plurality of parameters in accordance with lapse of time to values represented by said collective renewal data upon command of collective renewal, and for respectively allowing movement of the respective operation positions of said plurality of mechanical operators in accordance with the respective values of said plurality of parameters that are changed in accordance with lapse of time; and a release controlling step for stopping the change of the values of said plurality of parameters and for stopping the movement of said plurality of mechanical operators individually when a command of release of the collective renewal of the values of said plurality of parameters is issued in response to respective operation of said plurality of release operators during the change of the values of the parameters and the movement of the operation positions of the mechanical operators by said collective renewal controlling step.

* * * * *